(12) United States Patent
Iijima et al.

(10) Patent No.: US 7,067,096 B2
(45) Date of Patent: Jun. 27, 2006

(54) CARBON NANOTUBE-CARBON NANOHORN COMPLEX AND METHOD FOR PRODUCING THE SAME

(75) Inventors: Sumio Iijima, Aichi (JP); Masako Yudasaka, Ibaraki (JP); Akira Koshio, Mie (JP)

(73) Assignees: Japan Science and Technology Agency, Saitama (JP); NEC Corporation, Tokyo (JP)

( * ) Notice: Subject to any disclaimer, the term of this patent is extended or adjusted under 35 U.S.C. 154(b) by 203 days.

(21) Appl. No.: 10/499,010

(22) PCT Filed: Sep. 17, 2002

(86) PCT No.: PCT/JP02/09506

§ 371 (c)(1), (2), (4) Date: Jun. 18, 2004

(87) PCT Pub. No.: WO03/057623

PCT Pub. Date: Jul. 17, 2003

(65) Prior Publication Data

US 2005/0031525 A1    Feb. 10, 2005

(30) Foreign Application Priority Data

Jan. 8, 2002    (JP)    ............................. 2002-001803

(51) Int. Cl.
*B82B 3/00*    (2006.01)
*C01B 31/02*    (2006.01)

(52) U.S. Cl. .............................. 423/445 B; 977/DIG. 1
(58) Field of Classification Search ............ 423/445 B; 977/DIG. 1
See application file for complete search history.

(56) References Cited

OTHER PUBLICATIONS

Bandow, S. "Interlayer Spacing Anomaly of Single-Wall Carbon Nanohorn Aggregate," May 5, 2000, Elsevier Science B.V., Chemical Physics Letters, vol. 321 (2000), pp. 514-519.*
Iijima, S. et al., Chem. Phys. Lett., vol. 309, pp. 165-170 (1999).
Thess, A. et al., Science, vol. 273, pp. 483-487, (1996).
Dillon A.C., et al., Nature, vol. 386, pp. 377-379, (1997).
Yudasaka M., Appl. Phys. A. et al., vol. 71, No. 4, pp. 449-451, (2000).

* cited by examiner

*Primary Examiner*—Colleen P. Cooke
*Assistant Examiner*—Rebecca M. Stadler
(74) *Attorney, Agent, or Firm*—Wenderoth, Lind & Ponack, L.L.P.

(57) ABSTRACT

A novel carbon nanotube-carbon nanohorn complex produced by a method comprising step 1 for irradiating carbon nanotube placed in a liquid solvent with ultrasonic wave to disperse carbon nanotube into the liquid solvent, and step 2 for adding carbon nanohorn aggregate to the liquid solvent dispersed with carbon nanotube to thus remove the liquid solvent, whereby the surface of the carbon nanotube and the carbon nanohorn aggregate can be utilized more effectively and the availability can be enlarged.

7 Claims, 2 Drawing Sheets

CARBON NANOTUBE-CARBON NANOHORN COMPLEX AND METHOD FOR PRODUCING THE SAME

TECHNICAL FIELD

The invention of the present application relates to a carbon nanotube-carbon nanohorn complex and a method for producing the same. More specifically, the invention of the present application relates to a novel carbon nanotube-carbon nanohorn complex, which allows more effective utilization of a surface of a carbon nanotube and a surface of a carbon nanohorn aggregate and enlarges a scope of applicability thereof, as well as a method for producing the same complex.

BACKGROUND ART

Carbon nanotube and carbon nanohorn aggregate have been receiving keen attention as novel nano-structure substances which are potentially useful in a variety of fields such as information channel industry, chemical industry, and the like. There has been conducted a variety of applicative studies for utilizing characteristics of carbon nanotube and carbon nanohorn aggregate.

A carbon nanotube is a cylindrical carbon substance whose diameter is approximately 1 to 10 nm and length is a few micrometer. A carbon nanotube has a very regular, continuous structure of six-member rings. It is expected that utilization of the minute and unique form and electrical properties of a carbon nanotube will enable various applications thereof such as an application to a material for a fuel cell.

A carbon nanohorn aggregate is an aggregate in which plural carbon nanohorns, the tip end of each of which nanohorns has a horn-like sharp shape which would be obtained by sharpening a tip end of a carbon nanotube such that the tip end angle thereof is approximately 20°, are radially aggregated with a conical tip portion of each carbon nanohorn being disposed on the outer side, thereby forming a spherical complex whose diameter is approximately 100 nm. It is considered that such a carbon nanohorn aggregate is applicable to an adsorbing material or the like, by utilizing the aforementioned unique structure and a characteristic thereof of selectively adsorbing various types of gases.

With regard to the production of carbon nanotube and carbon nanohorn aggregate described above, there have been proposed several production methods which can achieve a high yielding rate. However, when carbon nanotubes are mass-produced, the produced carbon nanotubes tend to form bundles in which several tens of carbon nanotubes are aggregated with each other due to van der Waals force generated therebetween, and it is hardly possible to maintain the produced carbon nanotubes in a state in which the carbon nanotubes are each independently dispersed. In the case of carbon nanohorn aggregate, carbon nanohorn aggregates, which are very light carbon ultra-fine particles, can be easily dispersed in a solvent, even when the carbon nanohorn aggregates are mass-produced. However, in a case in which carbon nanohorn aggregates are solely dispersed in a solvent, the carbon nanohorn aggregates tend to be closely aggregated with each other, thereby causing a problem in that the structure specific to the carbon nanohorn aggregate cannot be effectively utilized.

In view of the above-described circumstances, one object of the invention of the present application is to provide a novel carbon nanotube-carbon nanohorn complex which solves the problems of the prior art, enables more effective utilization of a surface of a carbon nanotube and that of a carbon nanohorn aggregate and enlarges a scope of applicability thereof. The invention also provides a method for producing the same.

DISCLOSURE OF INVENTION

In order to achieve the above-described object, the invention of the present application provides the following aspects of the invention.

Specifically, in a first aspect, the invention of the present application provides a carbon nanotube-carbon nanohorn complex, characterized in that carbon nanotubes and carbon nanohorn aggregates are aggregated therein in a manner that the carbon nanotubes themselves are prevented from aggregating to each other and kept dispersed by the carbon nanohorn aggregates therebetween, while the carbon nanohorn aggregates themselves are prevented from aggregating to each other and kept dispersed by the carbon nanotubes therebetween.

Further, in a second aspect, the invention of the present application provides a method for producing a carbon nanotube-carbon nanohorn complex, comprising: step 1 for irradiating carbon nanotubes placed in a liquid solvent with ultrasonic wave to disperse the carbon nanotubes into the liquid solvent; and step 2 for adding carbon nanohorn aggregates to the liquid solvent in which the carbon nanotubes have been dispersed and then removing the liquid solvent.

Yet further, in a third aspect of the invention of the present application, the liquid solvent employed in the method for producing a carbon nanotube-carbon nanohorn complex of the second aspect is an organic solvent. In a fourth aspect of the invention of the present application, the production method of the second or third aspect further comprises step 1A for filtering the liquid solvent obtained by step 1, in which the carbon nanotubes have been dispersed, and then putting a filtrate back to a liquid solvent. In a fifth aspect of the invention of the present application, the production method of the fourth aspect further comprises step 1B for heating the carbon nanotubes filtered by step 1A in an oxygen atmosphere and then putting the carbon nanobues back to a liquid solvent.

BEST MODE FOR CARRYING OUT THE INVENTION

Figure 1:
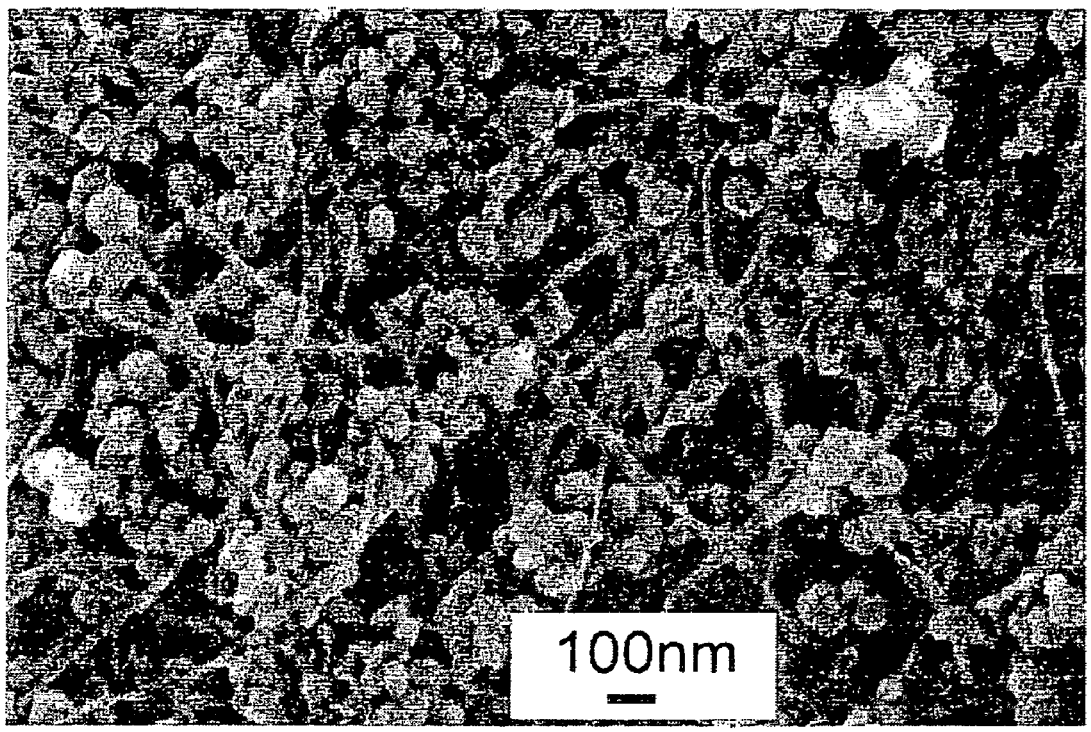
FIG. 1 is an example of SEM-observed image of a carbon nanotube-carbon nanohorn complex of the invention of the present application.

The invention of the present application has the aspects as described above. An embodiment of the invention will be described hereinafter.

A carbon nanotube-carbon nanohorn complex provided by the invention of the present application comprises a dispersion comprising of carbon nanotubes and carbon nanohorns, said dispersion being aggregated to form a complex. In this "dispersed state", only a very small number of carbon nanotubes are entangled, whereby no bundles or only a very small number, e.g., only a few bundles of carbon nanotubes are formed. Carbon nanohorn aggregates are almost evenly distributed between respective carbon nanotubes, so that the carbon nanotubes and the carbon nanohorn aggregates disperse each other and thus prevent each other from aggregating.

Accordingly, in the carbon nanotube-carbon nanohorn complex of the invention of the present application, by paying attention, for example, to the carbon nanohorn aggregates thereof, it is possible to utilize spaces formed between respective tip ends of carbon nanohorns, which spaces as a whole constitute a surface structure specific to a carbon nanohorn aggregate, in an extremely effective manner. Further, since substantially no bundles are formed in the carbon nanotubes thereof, the effective specific surface of the carbon nanotubes increases.

The carbon nanotube-carbon nanohorn complex as described above can be produced by the method for producing a carbon nanotube-carbon nanohorn complex of the invention of the present application, comprising step 1 for irradiating carbon nanotubes placed in a liquid solvent with ultrasonic wave to disperse the carbon nanotubes into the liquid solvent; and step 2 for adding carbon nanohorn aggregates to the liquid solvent in which the carbon nanotubes have been dispersed and then removing the liquid solvent.

In the method of the invention of the present application, diameter, length and the like of the carbon nanotube is not particularly limited. Either a single-walled carbon nanotube having a single-layered cylinder or a multi-walled carbon nanotube having a multi-layered cylinder may be used. Any appropriate type of carbon nanotube can be used in accordance with the desired inner volume, the object for use and the like, of the carbon nanotube-carbon nanohorn complex.

Similarly, diameter and the like of the carbon nanohorn aggregate are not particularly limited. Either a dahlia-like carbon nanohorn aggregate in which carbon nanohorns are aggregated like a dahlia flower or a bud-like carbon nanohorn aggregate in which carbon nanorns are aggregated like a flower bud may be used. Any appropriate type of carbon nanohorn can be used in accordance with the object for use and the like of the carbon nanotube-carbon nanohorn complex.

Regarding the liquid solvent, one selected from various types of solvents can be used. Examples of the liquid solvent which can be used include at least one type of solvent appropriately selected from the group consisting of: water; an acid such as sulfuric acid and hydrochloric acid; an inorganic solvent such as carbon disulfide; a hydrocarbon such as benzene, toluene and xylene; an organic solvent such as alcohol, ether, and a derivative thereof; a polymer such as methyl polymethacrylate (PMMA), polyethylene (PE), polyvinyl chloride (PVC); and a mixture thereof. In the invention of the present application, an organic solvent is the liquid solvent, which is the easiest to handle.

In step 1 of the invention of the present application, carbon nanotubes are placed in such a liquid solvent as described above. The mixture may optionally be stirred by a stirrer or the like, so that the carbon nanotubes well conform to the liquid solvent. Thereafter, the mixture is irradiated with ultrasonic wave. Approximately 0.1 to 0.5 g of carbon nanotubes per 1 liter of the liquid solvent, for example, is the preferable amount of the carbon nanotubes to be placed. When the carbon nanotubes dispersed in the liquid solvent in such a manner are irradiated with ultrasonic wave, bundles of the carbon nanotubes are disintegrated, and some portions of the carbon nanotubes are subjected to cutting, formation of deficient portions, formation of minute pores, and the like. At such a deficient portion, an interaction may occur between the carbon nanotube and a molecule of the liquid solvent. Specifically, when bundled carbon nanotubes are disintegrated, the disintegrated carbon nanotubes in general quickly re-form a bundle, due to a strong aggregation force derived from the van der Waals force. However, according to the method of the invention of the present application, the network of six-member rings of a graphite sheet which constitutes each carbon nanotube is made discontinuous after the bundles of carbon nanotubes are disintegrated, whereby the aggregation force derived from the van der Waals force acting between the carbon nanotubes is weakened and the dispersed state of the carbon nanotubes can be maintained.

It is preferable that the ultrasonic wave irradiated on the liquid solvent has relatively strong energy. Although energy of the ultrasonic wave cannot be generally defined, because the magnitude of the energy varies depending on the state of carbon nanotubes to be used, the type of the liquid solvent, the amounts of the carbon nanotubes and the liquid solvent, the time during which ultrasonic wave is irradiated, and the like, it is at least necessary to supply an amount of energy which is required for disconnecting the network of six-member rings of the graphite sheet. Specifically, irradiation with ultrasonic wave having energy of approximately 250 to 350 W/cm$^2$ for 3 to 6 hours will be one guideline of irradiation. More specifically, irradiation of approximately 15 to 30 ml of a liquid solvent with ultrasonic wave having energy of approximately 300 W/cm$^2$ for 5 hours can be given as a preferable example. The optimum irradiation time of ultrasonic changes in proportion to the amount of the liquid solvent. For example, when a few ml of a liquid solvent is used, the guideline irradiation time of ultrasonic wave may be one hour. When 100 ml of a liquid solvent is used, the guideline irradiation time of ultrasonic wave may be approximately 15 hours. In a more preferable condition of irradiating ultrasonic wave, when approximately 30 ml of a liquid solvent is used, ultrasonic wave having energy of approximately 300 W/cm$^2$ is to be irradiated for approximately 5 hours. During this irradiation process, irradiating the liquid solvent with ultrasonic wave in a state in which the liquid solvent is in direct contact with a chip or the like, as an ultrasonic wave-supplying means will enhance an effect caused by the irradiation.

Next, in step 2, carbon nanohorn aggregates are added to the liquid solvent in which the carbon nanotubes have been dispersed as describe above. The mixture is optionally be stirred so that the components therein are evenly mixed. Thereafter, the mixture is subjected to filtration, so that the liquid solvent is removed. In the invention of the present application, the mixing ratio of the carbon nanotube with respect to the carbon nanohorn aggregates is not particularly restricted and any appropriate ratio may be adopted in accordance with the object of application. For example, in a case in which the invention is applied to an electrode of a fuel cell, the weight ratio of 1:1 or so is presumably preferable because, at this ratio, both the carbon nanotube and the carbon nanohorn aggregate are well dispersed with neither of them exhibiting excessive/insufficient dispersion. In contrast, a case in which either the carbon nanotube content or the carbon nanohorn content is extremely large is not preferable, because the yield of the target complex will significantly decrease in such a case. In the present invention, the nanohorn aggregates placed into the liquid solvent evenly enter between the dispersed nanotubes and, after removal of the solvent, these nanohorn aggregates become solid with remaining in the state as described above. In this process, the carbon nanohorn aggregates are physically adsorbed at surfaces of the carbon nanotubes and also chemically adsorbed at the active cut, deficient and minute pore sites of the carbon nanotubes, which sites have been formed therein as descried above. As the components in the liquid solvent aggregate by the removal of the liquid solvent, the thus adsorbed carbon nanohorn aggregates are caught by the carbon nanotubes in an entangled manner. As a result, the carbon nanotube-carbon nanohorn complex of the invention of the present application, as described above, can be obtained.

When carbon nanotubes are mass-produced, there is a possibility that fullerene, amorphous carbon, catalyst metal particles and the like are mixed thereinto as impurities in the production process. A significantly large proportion of these impurities are present in the spaces between the carbon nanotubes. Therefore, in the invention of the present application, step 1A is carried out for filtering the liquid solvent obtained by the above-described step 1, so that the carbon nanotubes are dispersed and the impurities dissociated from the carbon nanotubes as a result of the dispersion of the carbon nanotubes can be removed. The filtered carbon nanotubes are placed in a fresh liquid solvent and step 2 as described above is started.

Further, in the invention of the present application, an additional step as step 1B may be carried out, in which the carbon nanotubes which has been filtered off by step 1A is heated in an oxygen atmosphere prior to being placed in a fresh liquid solvent. Regarding the condition of heating, a heating treatment is preferably conducted, for example, in 100% oxygen atmosphere, with the oxygen flow rate of 100 ml/min, at a pressure of 300 Torr and a temperature of 400° C. The molecules of the liquid solvent which have been reacted with the carbon nanotubes, as well as the remaining impurities and the like, can be removed by step 1B.

In the carbon nanotube-carbon nanohorn complex obtained as described above, the structure in which the nanohorn aggregates have entered in an entangled manner between the nanotubes which have been dispersed by the ultrasonic treatment can be maintained and thus the carbon nanotubes and the carbon nanohorns prevent each other from aggregating. Accordingly, the spaces between the conical tip ends, which spaces are specific to the structure of the carbon nanohorn aggregates, can be utilized very effectively. Further, it is also possible to disintegrate bundles of the nanotubes and effectively utilize the surface and inner space of the nanotubes.

According to the carbon nanotube-carbon nanohorn complex of the present invention, for example, a specific area for gas adsorption, of the aggregate, can significantly be increased and thus the adsorption capacity thereof will significantly be enhanced, as compared with a case in which the nanohorn aggregates are solely used. Further, in a case in which the carbon nanotube-carbon nanohorn complex is applied to an electrode material for a fuel cell or the like and used as material for carrying metal catalyst, the amount of the metal catalyst carried by the complex (per unit) can be increased and thus the performance of the material for carrying metal catalyst is likely to be enhanced.

The embodiment of the present invention will be described further in detail by the following example.

Hereinafter, the embodiment of the present invention will be described further in detail by the following example with reference to the accompanying drawings.

EXAMPLE

Single-walled carbon nanotubes were produced by a laser-ablation method, in which a graphite pellet as a target, to which Co and Ni as metal catalysts had been added, was ablated by second harmonic of Nd: YAG laser under Ar flow at 1200° C. In these single-walled carbon nanotubes, 50 or so tubes of various lengths were aggregated with each other, thereby forming bundles.

2% polymethyl methacrylate (PMMA) solution dissolved in monochlorobenzene (MCB) was used as a liquid solvent. 15 ml of this MCB solution and approximately 5 mg of the single-walled carbon nanotubes were mixed with other by a magnetic stirrer for 2 hours. A chip as a ultrasonic generating device (a vibration bar for generating ultrasonic wave), of which diameter was 3 mm, was brought into contact with the MCB solution, and the MCB solution was irradiated with ultrasonic wave. The treatment with ultrasonic wave was carried out in a condition in which energy was 300 W/cm$^2$ and irradiation time was 5 hours.

After being irradiated with ultrasonic wave, the MCB solution was filtered with a filter having minute pores of which diameter was 20 µm and a filter having minute pores of which diameter was 5 µm, whereby the single-walled carbon nanotubes was separated from the MCB solution and impurities. Further, in order to remove remaining MCB and carbonaceous impurities such as amorphous carbon, fullerene, carbon nano capsule and the like from the separated single-walled carbon nanotubes, the separated single-walled carbon nanotubes were subjected to a burning treatment in an oxygen atmosphere for 30 minutes, with the oxygen flow rate of 100 ml/min, at a pressure of 300 Torr and a temperature of 400° C.

Thereafter, the single-walled carbon nanotubes were placed in a MCB solution and the mixture was stirred by a magnetic stirrer. At this stage, it was confirmed that the single-walled carbon nanotubes were easily dispersed in the MCB solution and that aggregation of the single-walled carbon nanotubes did not occur and the dispersed state thereof was maintained after being stirred.

Carbon nanohorn aggregates were placed in the MCB solution in which the single-walled carbon nanotubes had been dispersed as described above, such that the weight ratio of the single-walled carbon nanotubes with respect to the carbon nanohorn aggregates was 1:1. The carbon nanohorn aggregates used in the present example was prepared by: irradiating a graphite target of φ30×50 mm provided in a reaction chamber (the room temperature, 760 Torr, Ar atmosphere) with $CO_2$ laser of which wave length was 10.6 µm and beam diameter was 10 mm, thereby generating carbon nanohorn aggregates; and collecting the produced carbon nanohorn aggregates on a collecting filter.

The resulting MCB solution was stirred by a magnetic stirrer and subjected to filtration, whereby a solid filtrate was obtained. The result of observation of the obtained substance by using a scanning electron microscope (SEM) is shown in FIG. 1, and the result of observation of the obtained substance by using a transmission electron microscope (TEM) is shown in FIG. 2.

In FIG. 1, those recognized as large or small spheres are the carbon nanohorn aggregates and those recognized, as narrow curved lines are carbon nanotubes. Approximately ten carbon nanotubes as a set form a bundle, which enters between the particles of the carbon nanohorn aggregates. From the analysis on FIG. 1, it was confirmed that the carbon nanotubes and the carbon nanohorn aggregates were well, evenly mixed with each other and that the carbon nanotube-carbon nanohorn complex, which exists in a highly dispersed state, of the invention of the present application, had been obtained.

Figure 2:
FIG. 2 is a photograph showing an example of a TEM-observed image of a carbon nanotube-carbon nanohorn complex of the invention of the present application.

From the analysis on FIG. 2, it was observed that the carbon nanohorn aggregates were entangled with bundles of the carbon nanotubes, each of which bundles was constituted of approximately 10 carbon nanotubes, such that the graphite layers of the carbon nanohorn aggregates were combined with those of the carbon nanotubes in a complicated manner. It was confirmed that the carbon nanohorn aggregates were physically adsorbed at surfaces of the pored carbon nanotubes, that the carbon nanohorn aggregates were also chemically adsorbed at the active minute pore sites or deficient sites of the pored carbon nanotube surfaces, and that the pored carbon nanotubes were aggregated with each other due to the van der Waals force, whereby a few to dozens of carbon nanohorn aggregates were caught by the aggregated pored carbon nanotubes such that the carbon nanohorn aggregates were entangled with the aggregated pored carbon nanotubes.

It should be noted that the present invention is not restricted to the above-described example and various modifications of details of the invention can be made.

INDUSTRIAL APPLICABILITY

As described above in detail, the present invention provides a novel carbon nanotube-carbon nanohorn complex which enables more effective utilization of a surface of a carbon nanotube and that of a carbon nanohorn aggregate and enlarges a scope of applicability thereof. The present invention also provides a method for producing the same.

The invention claimed is:

1. A carbon nanotube-carbon nanohorn complex, which comprises a dispersion comprising carbon nanotubes and carbon nanohorns, said dispersion being aggregated to form a complex.

2. A method for producing a carbon nanotube-carbon nanohorn complex, comprising:

a irradiating carbon nanotubes placed in a liquid solvent with ultrasonic waves to disperse the carbon nanotubes into the liquid solvent; and b adding carbon nanohorn aggregates to the liquid solvent in which the carbon nanotubes have been dispersed and then removing the liquid solvent.

3. The method for producing a carbon nanotube-carbon nanohorn complex according to claim 2, wherein the liquid solvent is an organic solvent.

4. The method for producing a carbon nanotube-carbon nanohorn complex according to claim 2, further comprising in a filtering the liquid solvent obtained by the step 1, in which the carbon nanotubes have been dispersed, and then putting a filtrate back to a liquid solvent.

5. The method for producing a carbon nanotube-carbon nanohorn complex according to claim 4, further comprising in b heating the carbon nanotubes filtered by step 1A in an oxygen atmosphere and then putting the carbon nanotubes back in a liquid solvent.

6. The method for producing a carbon nanotube-carbon nanohorn complex according to claim 3, further comprising in a filtering the liquid solvent obtained by the step 1, in which the carbon nanotubes have been dispersed, and then putting a filtrate back to a liquid solvent.

7. The method for producing a carbon nanotube-carbon nanohorn complex according to claim 6, further comprising in b heating the carbon nanotubes filtered by step 1A in an oxygen atmosphere and then putting the carbon nanotubes back in a liquid solvent.

* * * * *